United States Patent
Tuli

(10) Patent No.: US 9,146,542 B2
(45) Date of Patent: Sep. 29, 2015

(54) METHOD FOR MANAGING WEB ACCESS FROM A SMALL FOOTPRINT PORTABLE DEVICE

(76) Inventor: Raja Singh Tuli, Montreal (CA)

(*) Notice: Subject to any disclaimer, the term of this patent is extended or adjusted under 35 U.S.C. 154(b) by 472 days.

(21) Appl. No.: 12/398,717

(22) Filed: Mar. 5, 2009

(65) Prior Publication Data

US 2011/0004651 A1  Jan. 6, 2011

(51) Int. Cl.
| | |
|---|---|
| G06F 15/173 | (2006.01) |
| G06F 15/177 | (2006.01) |
| G06F 15/16 | (2006.01) |
| G04G 21/08 | (2010.01) |
| G06F 17/30 | (2006.01) |
| H04L 29/08 | (2006.01) |
| H04L 12/24 | (2006.01) |
| H04M 1/725 | (2006.01) |

(52) U.S. Cl.
CPC .......... *G04G 21/08* (2013.01); *G06F 17/30902* (2013.01); *H04L 67/04* (2013.01); *H04L 67/1095* (2013.01); *H04L 41/0806* (2013.01); *H04L 67/12* (2013.01); *H04L 67/306* (2013.01); *H04L 67/34* (2013.01); *H04M 1/72561* (2013.01)

(58) Field of Classification Search
CPC ............................ H04L 67/34; H04L 41/0806
USPC .................................................. 709/248, 224
See application file for complete search history.

(56) References Cited

U.S. PATENT DOCUMENTS

| | | | | |
|---|---|---|---|---|
| 7,103,353 | B2* | 9/2006 | Suzuki ...................... | 455/414.2 |
| 7,434,166 | B2* | 10/2008 | Acharya et al. ............... | 715/740 |
| 7,525,289 | B2* | 4/2009 | Janik et al. .................... | 320/158 |
| 7,768,234 | B2* | 8/2010 | Janik et al. .................... | 320/133 |
| 7,786,705 | B2* | 8/2010 | Janik et al. .................... | 320/158 |
| 7,788,369 | B2* | 8/2010 | McAllen et al. .............. | 709/224 |
| 2004/0242224 | A1* | 12/2004 | Janik et al. ................. | 455/426.1 |
| 2005/0135306 | A1* | 6/2005 | McAllen et al. .............. | 370/329 |
| 2005/0258806 | A1* | 11/2005 | Janik et al. .................... | 320/155 |
| 2006/0123053 | A1* | 6/2006 | Scannell .................... | 707/104.1 |
| 2006/0194549 | A1* | 8/2006 | Janik et al. ....................... | 455/73 |
| 2006/0240849 | A1* | 10/2006 | Suzuki ......................... | 455/465 |
| 2006/0253568 | A1* | 11/2006 | Lin .............................. | 709/224 |
| 2007/0162582 | A1* | 7/2007 | Belali et al. .................... | 709/223 |
| 2009/0104936 | A1* | 4/2009 | Lapstun et al. ............ | 455/556.1 |
| 2009/0135751 | A1* | 5/2009 | Hodges et al. ................ | 370/311 |

* cited by examiner

*Primary Examiner* — Hieu Hoang
(74) *Attorney, Agent, or Firm* — Goudreau Gage Dubuc; Hugh Mansfield

(57) ABSTRACT

The invention discloses a wrist watch that offers immediate access to regularly updated content of a previously selected group of web pages without requiring it to keep continually connected to the network. The concept takes advantage of the portability and convenience of a wrist watch and aggregates to it a customizable web browsing capability. A carefully designed power management scheme harmonizes the need of frequent data update with the small footprint of the watch. The update schedule is user-customizable and once connected to the network, the watch behaves exactly like a typical portable web-browsing device.

43 Claims, 2 Drawing Sheets

METHOD FOR MANAGING WEB ACCESS FROM A SMALL FOOTPRINT PORTABLE DEVICE

FIELD OF THE INVENTION

The present invention generally relates to interne browsing portable devices. More specifically, the invention addresses a watch that receives updated content from a pre-selected group of web pages and keeps it cached in the watch memory for ready access by the user.

BACKGROUND OF THE INVENTION

The underlying concept is that people are interested in having updated information on certain specific topics continually available, but don't want to go through the hassle of connecting to a network, looking for the specific source, etc. Once the interest in checking certain information arises, people want to have it immediately. As people habitually check their wrist watches on a regular basis, it is desirable to have said updated information made readily available in this device with no need to ask for it. However, the typical size and weight restrictions associated with the small footprint of a wrist watch require ingenuous power management. Ideally, the Network Module of the wrist watch does not remain powered up while not needed, as the watch does not have the power to supply the circuitry required to remain continually connected to the network.

The connection to the web using a portable device typically involves a certain delay associated with connecting to a remote server over a wireless network. When the user wishes to have access to the most up-to-date information on the weather, stock market, news, etc. the process of accessing said information involves the steps of powering up the portable device, logging onto the network, accessing a remote server, navigating to the website that contains the desired information and waiting until said information is displayed on the device.

The prior art includes US 2002/0,059,166 by Wang, which discloses a method for parsing web codes which involves the selection of web content and its storage in portable devices. The selected content is not updated automatically, requiring active intervention by the user to connect to the web and request an update of the content previously stored in the portable device. Furthermore, Wang does not address the power management issues associated with a small footprint portable device.

SUMMARY OF THE INVENTION

According to a certain aspect of the present invention, the portable device is a watch that offers immediate access to regularly updated content of a previously selected group of web pages without requiring it to keep continually connected to the network. The concept takes advantage of the portability and convenience of a wrist watch and aggregates to it a customizable web browsing capability. A carefully designed power management scheme harmonizes the need of frequent data update with the small footprint of the watch, which imposes restrictions in the size and therefore storage capacity of the battery. The update schedule is user-customizable and once connected to the network, the watch behaves exactly like a typical portable web-browsing device.

The above as well as additional features and advantages of the present invention will become apparent in the following written detailed description.

BRIEF DESCRIPTION OF THE DRAWINGS

A more complete understanding of the present invention may be had by reference to the following detailed description when taken in conjunction with the accompanying drawings, wherein.

DESCRIPTION OF THE PREFERRED EMBODIMENTS

Figure 1:
FIG. 1 is a perspective view illustrating a wrist watch according to an aspect of the present invention.
Figure 2:
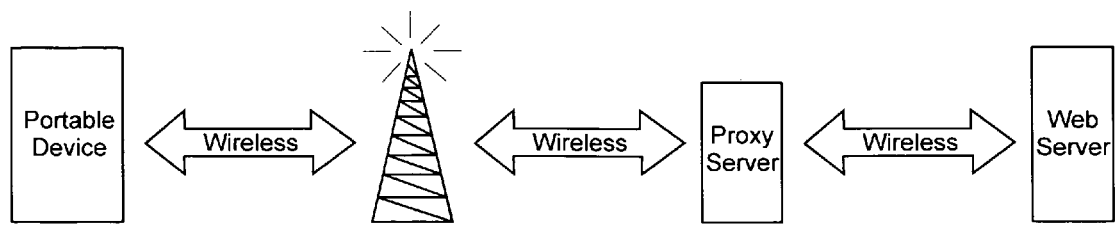
FIG. 2 is a schematic drawing illustrating the basic elements of the communication network and the flow of data between them according to an aspect of the present invention.
Figure 3:
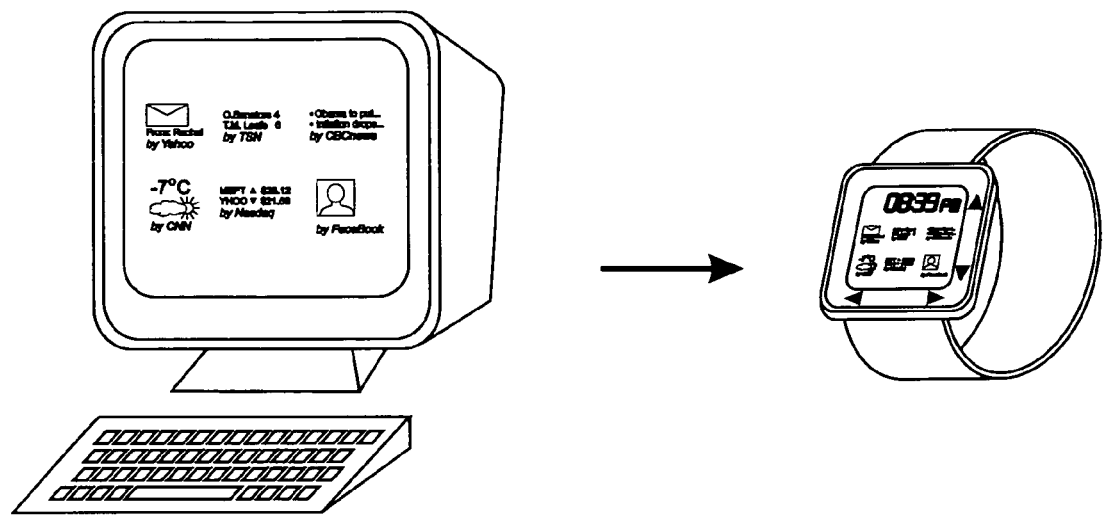
FIG. 3 is a schematic drawing illustrating the selection of the report list web pages with the wrist watch connected to a domestic computer logged to a specific web page according to an aspect of the present invention.
Figure 4:
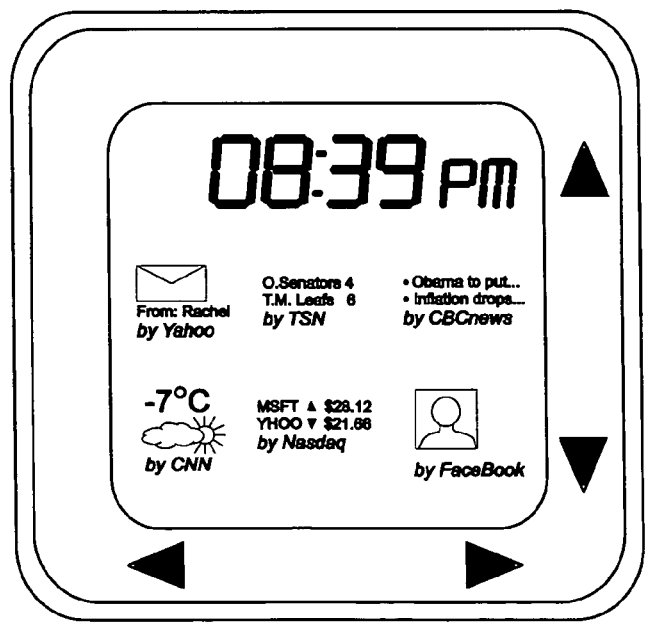
FIG. 4 is a plan view illustrating the front panel of a wrist watch according to an aspect of the present invention.

The wrist watch is small and compact, which imposes restrictions on the size—and therefore storage capacity—of the battery that can be used to power it and thus require judicious allocation of the available power. In order to reconcile the amount of energy that would be required for keeping the Network Module circuitry energized at full power with the small footprint of the device—which externally looks like an ordinary wrist watch—the invention utilizes specific power management schemes both in the watch CPU Module and the Network Module circuitry. The use of remote processing, where the application the user is operating is actually run by a remote server instead of running in the watch itself, allows for further power saving.

Physical Description of the Watch

According to an exemplary embodiment of the present invention, the wrist watch frequently receives the updated contents of selected web pages from a remote web server over a wireless network. The remote web server gets updated contents from these selected web pages on a continuous basis. The watch is continually connectable to a cellular phone network, such as a GSM, GPRS, CDMA or 3G, which is the data part of the network. The watch features an image display of 70 pixels by 140 pixels, dedicated directional arrow keys in the front panel for scrolling up, down, left and right. A virtual keyboard can be brought up on the touch-sensitive screen of the image display. The user can touch the image display and drag the content around like in the Apple® i-Phone®.

Regarding function, the watch can be divided in three main structures: a display, a CPU Module and a Network Module. The visual interface with the user utilizes a display incorporating bi-stable technology that can retain an image without power. Once the Image is formed in the display, it does not require any power to remain there, which contributes to minimizing power consumption. The crystals that make up the display surface may exist in one of two stable orientations (typically black and "white", although it can also be colored), and power is only required to change the image displayed. The watch incorporates a wireless communication system that includes a dedicated module for web connection, henceforth referred to as the Network Module. The Network Module incorporates an RF antenna and a modem unit. The connection between the watch and the Internet is established via wireless link to cell phone towers or equivalent wireless infrastructure. The connection between the watch display and the watch Network Module is made through the watch CPU Module. The watch internal CPU Module incorporates cache memory for storing web page content, as well as a real time clock.

Independently of the various power management schemes that will be detailed further below, the watch CPU Module runs a routine for ensuring that the time displayed in the watch panel is always correct. The aforementioned routine has the CPU Module switching itself ON at regular time intervals—for instance every half an hour—and energizing the watch panel bi-stable display. It then compares the time indicated the watch display to that indicated in the real time internal clock. If they are different the watch corrects the time displayed, basing said corrections on the real time clock integrated in the watch CPU Module.

A certain menu of customized web pages can be selected by the user at home, by logging on to a specific web page from his/her home computer. These are henceforth referred to as the report list web pages. There is a number of standard web pages—for example 3—that is pre-selected by the service provider company. Although the user cannot remove the standard web pages from the report list, there is an option for changing or formatting certain details on them. Further aspects of the watch operation are user-customizable through the service's web page. The user can customize the content on each of the pre-selected web pages. For example, it is possible to have the e-mail application page regularly storing in the watch cache memory enough data to allow the user to see more than one page of text, typically made accessible through the use of the directional arrow keys in the watch panel.

Once logged on the specific web page of the service provider server and into his/her particular User Profile, the user has access to tools that allow actual design of the pages that will be displayed in his watch. Among the features that can be included in each specific web page of the report list, the user can custom-select specific threshold events that will trigger the sending of a Threshold Update Message from the server. For instance, said threshold events can be the arrival of an e-mail at the remote server, the report of a goal scored on a hockey game or the report of a certain stock rate hitting a pre-selected level. The user can drag and drop elements of the page from a menu, see a preview of the display, set up the threshold events that will trigger transmission of an immediate update from the server to the watch, etc.

Once the user is done designing his selected WebPages and these are stored in his user profile, the server sends the designed display image—respecting the selections of elements, size, etc. as selected by the user—to the watch for the user to see it. The format of the report list web pages is stored in the CPU Module cache memory as an image. The content of each report list webpage is conveyed to the user by means of the page's image, and said image content is updated periodically when new images are received from the remote server, in a process denominated Remote processing that will be detailed further below.

Once the user selects those web pages that will be included in the report list, the user-selected pages and the service provider's standard choice pages are uploaded to that user's watch. The report list is uploaded to that specific user's profile in the service provider's server, so that the server keeps track of which pages shall be regularly updated for that specific user's watch. In a typical scenario, the user would have six web pages in the uploaded report list: weather, news and facebook—pre-selected by the service provider company—plus e-mail inbox, sport scores and specified stock tickers, custom-chosen by that particular user. As discussed in detail further below, the remote server frequently sends to the watch an update for the content of these six selected web pages. Each of these constantly updated pages contains a representation of the corresponding home page, including any links displayed in it. The content of these report list web pages is stored in the cache memory of the watch CPU, which makes it immediately available at any time for the user with no need for actual connection to the web. If however the user chooses to view data that is beyond what is stored in these report list web pages—for instance navigating to a web page that is not in the report list—the desired content is acquired from the web in real time, with the Network Module connecting to the web and affording regular navigation from the watch.

The service provider's server performs a graphic size conversion in order to adapt the web page size and layout to the dimensions of the watch display. This size conversion however is performed only for the pre-selected web pages on the report list. For other pages accessed during navigation the user must scroll through the page in order to see the whole of it, as the size of the watch display is smaller than that of a standard computer screen.

Introduction of the Power Management Scheme

The specific power management schemes implemented in the watch CPU Module and the Network Module circuitry will now be described.

For the CPU Module circuitry there are two stages of powering: OFF, in which the CPU Module is not powered, and ON in which the CPU Module is running at full power. For the Network Module circuitry there are three different powering states: In the OFF powering state the circuitry is not powered. In the Standby Mode powering state the Network Module behaves much like a standard cell phone: Most of the time it remains unpowered; interspersed with short periods in which the Network Module escalates to the minimum power status required for sending brief, periodical pulses to the nearest network tower, with the Network Module circuitry returning to the unpowered status right after broadcasting these brief pulses in case there is no pending connection request. In a typical scenario, these pulses last for 1 millisecond and are sent on every 2 seconds, prompting for any connection request by the remote web server. When a prompt meets a server connection request, the Standby Mode is escalated to full power, in the manner to be described in detail further down. The third powering state is ON, wherein the Network Module circuitry is in continual full power.

The powering states of both the CPU Module and Network Module of the watch change according to the passing of time and/or user action, and will be best understood in the following description of the operation of the watch itself.

Description of the User Just Checking the Cached Content without Switching the Network Module ON For most of the time both the CPU Module and the Network Module are in their OFF powering state and the watch display exhibits the main page, as illustrated in FIG. 1. That includes the display of the time plus a condensed data set on each of the report list web pages. An example of condensed data set for the weather would comprise a numeric indication of the current temperature, a pictorial indication of the weather and an indication of the data source. These condensed data sets perform as icons, and when the user clicks on them the watch displays the corresponding web page with the full data set as stored in the CPU Module cache memory. The user defines how many of the report list web pages will have their condensed data set displayed on the main page, and the display size of each condensed data set is automatically optimized for the available display space.

In a first embodiment of the invention, the user can scroll through the individual pages corresponding to the condensed data sets depicted on the main page by pressing the arrow keys in the panel of the watch or pressing one of the condensed data sets displayed on the touch-sensitive screen. The pressing of any of the arrow keys or condensed data sets triggers the switching ON of the watch CPU. As the CPU Module in switched ON, the data stored in the cache memory is made available and the user can scroll through each individual web page with the full data set as stored in the CPU Module cache memory, which is depicted in the watch display. Provided that the user does not click on any links that might be featured on a report list web page, the Network Module is not switched ON. Once a certain period of time elapses with no further action by the user, the CPU Module switches itself back to the OFF state.

In an alternative embodiment, once the CPU Module is switched ON by the pressing of any of the arrow keys or condensed data sets in the watch panel, the CPU Module switches ON the Network Module in anticipation of the user intention of navigating, which is materialized once the user actually clicks on any of the links provided in the report list web pages. Once a certain period of time elapses with no further action by the user, the CPU Module switches the Network Module and then itself back to the OFF state.

Description of how the Elapsing of a Preset Time Triggers the Switching ON of the Network Module and Also Triggers the Download of Web Content Update In a second embodiment of the invention, a period of time is previously set for the cyclic switching ON of the watch CPU. Once said preset time value elapses—for instance every 10 minutes—the watch CPU Module goes from the OFF state to the ON state. Then the CPU Module switches the Network Module power state from OFF to the Standby Mode, and the Network Module prompts the network for any connection request by the remote web server.

In case the server indeed has a pending connection request, the CPU Module immediately escalates the powering state of the Network Module from the Standby Mode to ON, after which the connection between the Network Module and the remote server is sought. Once the Network Module is ON, the establishment of the connection to the network takes from 8 to 10 seconds, during which an hour-glass animation on the watch display reports to the user that such connection is being established. Once the connection is established, the Network Module updates the 6 report list web pages by downloading any changes to their display images from the remote server to the watch cache memory. As soon as the watch CPU Module establishes that the download is complete, connection to the web is interrupted and the Network Module circuitry is powered OFF. The Network Module remains powered OFF until the next cycle of periodical prompting, which in the given example would happen 10 minutes later.

In case the server has no pending connection request, the CPU Module switches the Network Module circuitry OFF. The Network Module remains powered OFF until the next cycle of periodical prompting, which in the given example would happen 10 minutes later. As previously described, if the user does not click on any of the links featured on the report list web pages and a certain period of time elapses with no further action by the user, the CPU Module switches itself back to the OFF state and the watch display exhibits the main page, with the condensed data sets already incorporating any changes as recently stored in the cache memory. This arrangement allows for very small net energy consumption, and is the power management scheme of choice in the primary embodiment envisaged for the present invention. All the while the watch display exhibits the main page, with any changes as recently stored in the cache memory.

Description of the Network Module Working in Standby Mode as Default

In a third embodiment of the invention, the watch CPU Module is kept powered ON and the Network Module is continually kept on the Standby Mode. In a manner similar to the standard operation of a cell phone, it sends brief, periodical pulses to the nearest network tower. For instance these pulses last for 1 millisecond and are sent on every 2 seconds, prompting for any connection request by the remote web server.

In case the server has no pending connection request, no immediate action is taken and the Network Module remains in the Standby Mode.

In case the server has a pending connection request, the Network Module—that was so far in the Standby Mode—escalates its powering state to ON, and then seeks connection with the remote server over the Internet. Once the Network Module is ON, the establishment of the connection to the network takes from 8 to 10 seconds, during which an hour-glass animation on the watch display reports to the user that such connection is being established. Once the connection is established, the Network Module updates the 6 report list web pages by downloading any changes to their display images from the remote server to the watch cache memory. As soon as the watch CPU Module establishes that the download is complete, connection to the web is interrupted and the Network Module circuitry returns to the Standby Mode, remaining in it until a further periodical pulse meets a new connection prompt. All the while the watch display exhibits the main page, with any changes as recently stored in the cache memory.

The net energy consumption of this embodiment is higher compared to the one of the primary embodiment. However, it has the advantage of higher frequency of cache memory update, avoiding the delay imposed by the power management scheme that prompts for updates only after the cyclic interval, for instance every 10 minutes.

Description of a Preset Event Triggering the Switching of the Network Module ON

In a fourth embodiment of the invention, the watch CPU Module is kept powered ON and the Network Module is continually kept on the Standby Mode, in a manner similar to the standard operation of a cell phone.

Following the custom settings previously recorded on each of the report list web pages on the user profile at the remote server, the server sends to the watch a Threshold Update Message whenever one of the specified threshold events occur, such as the arrival of an e-mail at the remote server, the report of a goal scored on a hockey game or the report of a certain stock rate hitting a pre-selected level. This message is received on the very next opportunity, namely the next time the watch Network Module prompts for any connection request by the remote web server according to the Standby Mode cyclic schedule—for instance two seconds later. As the prompt meets the server connection request, the Standby Mode is escalated to full power, the connection between the Network Module and the server is established and the Threshold Update Message will push to the watch cache memory a non-cyclic update. This sequence of events will be triggered by the happening of any one of the customizable threshold events specified by the user. Again, all the while the watch display exhibits the main page, with any changes as recently stored in the cache memory.

The scope of custom options made available to the user upon specifying threshold events includes the setting of custom audio alarms to be broadcast by the watch for each particular threshold event, so that the user can enjoy a convenient and timely notification upon the occurrence of threshold events.

In an alternative embodiment, the user is allowed to set up the elapsing of a time interval as the threshold event, according to the hired service plan and the model of the watch.

Description of the User Clicking of a Link in One of the Report List Web Pages, Starting Up Regular Navigation and the Use of Remote Processing In a fifth embodiment of the invention, while the CPU Module and the Network Module of the watch are switched OFF, the user uses the arrow keys to scroll through the report list web pages or presses one of the condensed data sets displayed on the touch-sensitive screen and thus triggers the switching ON of the watch CPU. When the user clicks on any of the links featured on the report list web pages, the CPU Module switches the Network Module ON.

In an alternative embodiment, once the CPU Module is switched ON by the pressing of any of the arrow keys or condensed data sets in the watch panel, the CPU Module switches ON the Network Module in anticipation of the user intention of navigating, which is materialized once the user actually clicks on any of the links provided in the report list web pages.

Once the Network Module is ON, the establishment of the connection to the network takes from 8 to 10 seconds, during which an hour-glass animation on the watch display reports to the user that connection is being established. After that—once the network connection is established between the Network Module and the remote server—navigation is as fast as the bandwidth allows, and the watch initiates regular web navigation using remote processing, as described below.

Description of the Remote Processing

The situation in which the user is reviewing content that is stored in the watch CPU Module cache memory has already been described. When the user chooses to view data that is beyond what is stored in the report list web pages, the watch performs the role of a portable browsing device, and the remote processing mentioned earlier in this description comes into play. The remote processing is employed whenever the user is browsing any web pages that are not cached in the CPU Module memory, being thus core to the invention and available in all of its embodiments.

Although there is no delay to suggest it to the user, the watch CPU Module does not run the application itself. The application operated by the user—be it a browsing application, an e-mail application or some other application—is actually run at the remote server, and the watch plays the role of a visual interface between the user and the virtual display of the remote server where the application is being run. In other words, the watch displays for the user the image he/she would be seeing in the screen of the remote server if it were in visual range.

The transmission from the remote server to the watch is streamlined to contain no more than bitmap images plus any navigational links that may be featured on the webpage. For example, when the server gets an update on weather forecast, the corresponding data is depicted in the server's virtual display. In order to make this updated information available for the watch user, the server rasterizes said updated image from its virtual display, compresses it and transmits it to the watch in blocks or frames over the Internet; the watch stores said updated image in cache memory and makes it readily available for the user to see in the watch display. For those web pages included in the report list, the server converts the updated image following the custom sized design set on the User Profile before rasterizing, compressing it and transmitting to the watch; for the web pages that are not in the report list the images are sent in their standard size and the user has the option of scrolling vertically and horizontally to display the whole image in the watch screen, which is smaller than the standard computer screen for which the pages were originally designed.

The images that appear on the watch display are bitmap images. Besides regular text and pictures, said images may include graphic representations of web navigation links, software command buttons and other elements through which the user communicates his intentions to the remote running application. The user clicks on an element on the watch display based on his visual identification of its image. The watch transmits the graphic coordinates of this click to the remote server. Once the click coordinates are received by the server, where the actual application is running, the server processes the corresponding click. If the click causes the application to perform some action—such as navigating to a different web page or performing a given software command—the application takes the requested action, updating the image on the server's virtual display accordingly. The remote server then rasterizes and compresses the updated bitmap image and transmits it in blocks or frames to the watch. This data is received by the watch, rendered by the watch CPU Module and presented in the watch display for the user. As the actual processing is performed in the remote server, the workload of the watch CPU Module is low and the user is kept abreast of the processing by the continued updating of the image presented in the watch display.

While this invention has been particularly shown and described with reference to a preferred embodiment, it will be understood by those skilled in the art that various changes in form and detail may be made therein without departing from its spirit and scope.

I claim:

1. A method for managing web access from a plurality of small footprint portable devices each associated with a respective user, comprising the steps of:

each respective user using one of a plurality of domestic computers to modify a respective user profile stored in a remote service provider server to which the portable devices are connectable across at least one wireless network, each respective user profile detailing web content updates to be retrieved for the respective user;

retrieving web content updates customized in accordance with each user profile at the remote service provider server;

for each of the portable devices, selecting on the portable device a power management and operational scheme for periodically and automatically retrieving the customized web content updates from the remote service provider server;

wherein the power management and operational scheme comprises periodical power supply switching of a wireless communication system incorporated in the portable device and verifying an availability of web content updates at the remote service provider server via the wireless communication system.

2. The method according to claim 1, wherein the portable device comprises a display and a cache memory, the display continually exhibiting a main page that incorporates any changes as recently stored in the cache memory.

3. The method according to claim 1, wherein a frequency of power supply switching of the wireless communication system is adjustable.

4. The method according to claim 3, wherein the power management and operational scheme allows the frequency of adjustment to be made by a user.

5. The method according to claim 1, wherein as soon as the wireless communication system is switched ON the wireless communication system prompts the network for any connection request by the remote service provider server.

6. The method according to claim 5, wherein if there is a pending connection request, connection between the wireless communication system and the remote service provider server is sought.

7. The method according to claim 5, wherein if there is no pending connection request, the wireless communication system is switched off and remains so until next cycle of periodical prompting, which is defined according to the power management and operational scheme.

8. The method according to claim 6, wherein as soon as the connection between the wireless communication system and the remote service provider server is established the wireless communication system commands a content update by downloading any updates from the remote service provider server to the portable device.

9. The method according to claim 8, wherein as soon as the downloading is complete, connection to the web is interrupted and the wireless communication system is powered Off, remaining so until next cycle of periodical prompting, which is defined according to the power management and operational scheme.

10. The method according to claim 1, wherein during a period between two consecutive content updates a user can access and display the data stored in the portable device without triggering the power supply switching of the wireless communication system.

11. The method according to claim 1, wherein a connection between a Network Module of the portable device and the Internet is established via wireless link to cell phone towers or equivalent wireless infrastructure.

12. The method according to claim 1, the portable device further comprising an integrated internal clock and a display where it indicates current time for a user, wherein at regular intervals the portable device compares the time indicated in said display to a real time internal clock integrated in the portable device and replaces the displayed time with the internal clock time in case there is any discrepancy.

13. The method according to claim 1, wherein said content updates come from the remote service provider server, which gets said content updates from corresponding web pages on a continuous basis.

14. The method according to claim 1, wherein the input provided by a user includes a selection of web pages which frequently updated content the user wants to keep readily available in the portable device memory.

15. The method according to claim 14, wherein the input further includes specific information on a format and design of each of the selected web pages.

16. The method according to claim 1, wherein the content update data transmitted from the remote service provider server to the portable device comprises rasterized and compressed image frames.

17. The method according to claim 1, wherein the content update data stored in the portable device is used to reproduce on the portable device display an image corresponding to a virtual display of the remote service provider server.

18. The method according to claim 17, wherein the image displayed in the portable device is updated whenever new content update data is received by the portable device.

19. The method according to claim 1, wherein the content update data transmitted from the remote service provider server to the portable device comprises graphic representations of web navigation links.

20. The method according to claim 19, wherein when a user clicks on a graphic representation of a web navigation link displayed on the display of the portable device, the portable device transmits corresponding graphic coordinates of this click to the remote service provider server.

21. The method according to claim 20, wherein once the click coordinates are received by the remote service provider server, any resulting updates to the image on the server's virtual display are rasterized, compressed and transmitted in frames back to the portable device for display to the user.

22. A method for managing web access from a plurality of small footprint portable devices each associated with a respective user, comprising the steps of:

Each respective user using one of a plurality of domestic computers to modify a respective user profile stored in a remote service provider server to which the portable devices are connectable across at least one wireless network, each respective user profile detailing web content updates to be retrieved for the respective user;

at the remote service provider server, retrieving for each user web content updates customized in accordance with each user profile;

for each of the portable devices, keeping the wireless communication system incorporated in the portable device in a default standby mode powering state pending detection of a connection request by the remote service provider server, while sending brief, periodical pulses to a nearest network tower prompting for any connection request by the remote service provider server;

whenever a pending connection request by the remote service provider server is detected by a receiving one of said portable devices, escalating a powering state of the wireless communication system of said receiving portable device from the default standby mode powering state to full power, establishing connection with the remote service provider server over the Internet and initiating downloading of any available web content updates retrieved for the user associated with said receiving portable device from the remote service provider server to the portable device;

once the downloading is completed, interrupting the Internet connection with the remote service provider server with said receiving portable device, returning the powering state of the wireless communication system of said receiving portable device to the default standby mode powering state.

23. The method according to claim 22, wherein the portable device comprises a display and a cache memory, the display continually exhibiting a main page that incorporates any changes as recently stored in the cache memory.

24. The method according to claim 22, wherein a frequency of power supply switching of the wireless communication system is adjustable.

25. The method according to claim 24, wherein the power management and operational scheme allows the frequency of adjustment to be made by a user.

26. The method according to claim 22, wherein as soon as the wireless communication system is switched ON the wireless communication system prompts the network for any connection request by the remote service provider server.

27. The method according to claim 26, wherein if there is a pending connection request, connection between the wireless communication system and the remote service provider server is sought.

28. The method according to claim 26, wherein if there is no pending connection request, the wireless communication system is switched off and remains so until next cycle of periodical prompting, which is defined according to the power management and operational scheme.

29. The method according to claim 27, wherein as soon as the connection between the wireless communication system and the remote service provider server is established the wireless communication system commands a content update by downloading any updates from the remote service provider server to the portable device.

30. The method according to claim 29, wherein as soon as the downloading is complete, connection to the web is interrupted and the wireless communication system is powered Off, remaining so until next cycle of periodical prompting, which is defined according to the power management and operational scheme.

31. The method according to claim 22, wherein during a period between two consecutive content updates a user can access and display the data stored in the portable device without triggering the power supply switching of the wireless communication system.

32. The method according to claim 22, further comprising the step of setting one or more user-specified threshold events that will trigger sending of a content update from the remote service provider server to the portable device, wherein once a threshold event occurs the remote service provider server issues an immediate connection request, which is detected by the portable device in next periodical pulse to the nearest network tower prompting for any connection request by the remote service provider server.

33. The method according to claim 22, wherein a connection between a Network Module of the portable device and the Internet is established via wireless link to cell phone towers or equivalent wireless infrastructure.

34. The method according to claim 22, the portable device further comprising an integrated internal clock and a display where it indicates current time for a user, wherein at regular intervals the portable device compares the time indicated in said display to a real time internal clock integrated in the portable device and replaces the displayed time with the internal clock time in case there is any discrepancy.

35. The method according to claim 22, wherein said content updates come from the remote service provider server, which gets said content updates from corresponding web pages on a continuous basis.

36. The method according to claim 22, wherein the input provided by a user includes a selection of web pages which frequently updated content the user wants to keep readily available in the portable device memory.

37. The method according to claim 36, wherein the input further includes specific information on a format and design of each of the selected web pages.

38. The method according to claim 22, wherein the content update data transmitted from the remote service provider server to the portable device comprises rasterized and compressed image frames.

39. The method according to claim 22, wherein the content update data stored in the portable device is used to reproduce on the portable device display an image corresponding to a virtual display of the remote service provider server.

40. The method according to claim 39, wherein the image displayed in the portable device is updated whenever new content update data is received by the portable device.

41. The method according to claim 22, wherein the content update data transmitted from the remote service provider server to the portable device comprises graphic representations of web navigation links.

42. The method according to claim 41, wherein when a user clicks on a graphic representation of a web navigation link displayed on the display of the portable device, the portable device transmits corresponding graphic coordinates of this click to the remote service provider server.

43. The method according to claim 42, wherein once the click coordinates are received by the remote service provider server, any resulting updates to the image on the server's virtual display are rasterized, compressed and transmitted in frames back to the portable device for display to the user.

* * * * *